J. W. MILLER.
FITTING FOR AEROPLANES.
APPLICATION FILED JULY 3, 1918.

1,290,281.

Patented Jan. 7, 1919.

INVENTOR
John W. Miller.
BY
Henry L. Reynolds
ATTORNEY

UNITED STATES PATENT OFFICE.

JOHN W. MILLER, OF SEATTLE, WASHINGTON, ASSIGNOR TO BOEING AIRPLANE COMPANY, OF SEATTLE, WASHINGTON, A CORPORATION OF WASHINGTON.

FITTING FOR AIRPLANES.

1,290,281.  Specification of Letters Patent.  Patented Jan. 7, 1919.

Application filed July 3, 1918. Serial No. 243,211.

*To all whom it may concern:*

Be it known that I, JOHN W. MILLER, a citizen of the United States, and resident of the city of Seattle, county of King, State of Washington, have invented certain new and useful Improvements in Fittings for Airplanes, of which the following is a specification.

My invention relates to a fitting designed for employment in the construction of airplanes and particularly as a means for supporting a hinged strut and certain tension members of the framework.

The object of my invention is to furnish a fitting for these purposes which is light in weight, strong and simple in construction, and which has many advantages in convenience of manufacture, application and use and in the manner in which it takes care of the connections desired.

The features of my invention upon which I desire a patent will be defined by the claim terminating this specification. The accompanying drawings show my invention embodied in the type of construction which I now most prefer to use.

The particular purpose for which this fitting is desired is to provide means whereby a strut may be hingedly connected with a bar and also whereby certain tension members, as wire stays, may also be connected with the same bar.

Figure 1:
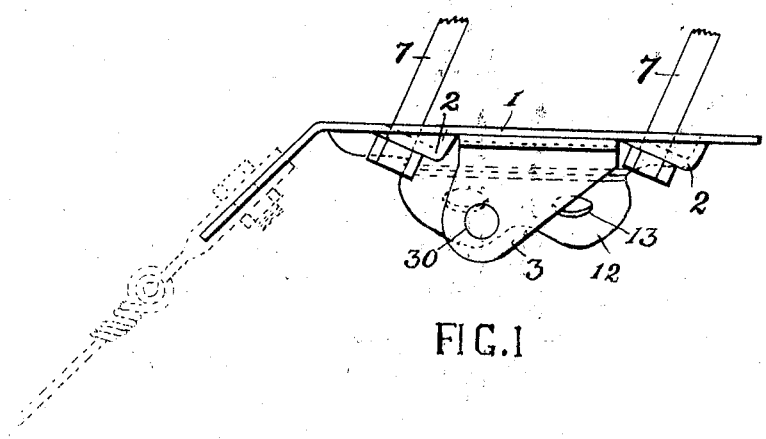
Figure 1 is a side view of this fitting, showing with it, a portion of the bolts by which it is secured in place upon the main framework of the airplane, and also showing in dotted lines the manner of connecting one of the tension members thereto.

This fitting contains a base plate 1, which is of rolled steel and is stamped and bent into shape in the manner which will be hereinafter described. In the particular use for which this fitting has been designed, it is intended to be mounted upon a bar of which the adjacent sides are not at right angles. The width of the bar to which it is to be secured is indicated by the distance between the securing bolts 7, shown in Fig. 1, which bolts lie close against the outer surfaces of the larger sides of this main frame bar.

To furnish a proper seat for the heads and nuts of the securing bolts 7, I stamp up from the plate 1, inclined bosses 2. These have their surfaces which engage the bolt heads, at right angles to the axis occupied by the bolts when in use. In consequence, it is unnecessary to provide beveled or inclined washers beneath the heads. Further, these seats being integral with the base plates, there is no tendency in the bolt to slide laterally on the plate, due to an inclined surface between plate and washer.

At one end of the base plate 1, I form an ear 11 which is perforated for the reception of a bolt, or other member, by which a tension stay may be connected therewith. Such a connection and the end of a tension stay, is indicated by dotted lines in Fig. 1. This ear 11 is bent up into a position at an angle with the main body of the base plate, in order to be alined with the direction of the pull of this tension member.

Figure 3:
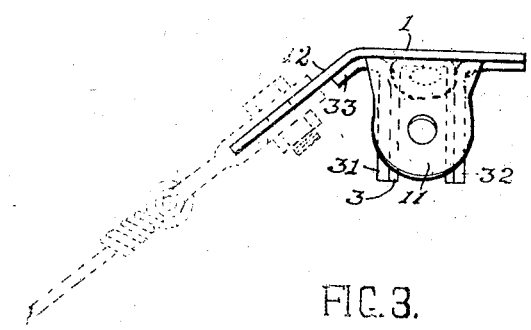
Figs. 3 and 4 are end views of the fitting taken respectively from opposite ends thereof.
Figure 4:
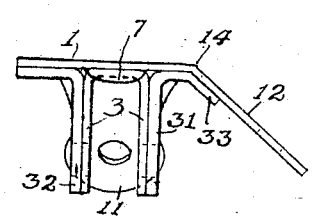

At one side of the base plate, 1, is a large double ear, 12. This might, of course, be two separate ears as desired, but I prefer to have them integrally joined together so as to make one double ear and provide it with two perforations 13, for the reception of bolts, by which the tension members may be connected therewith. This ear is also bent upward at an angle, as clearly shown in Figs. 3 and 4.

Upon the outer face of the base plate are secured certain members which form a pair of pivot ears 3. These pivot ears are provided with holes 3 by which a strut may be pivotally connected therewith. The manner of forming these ears which I prefer is as follows:

A U-shaped stamping, 3, cut and bent from sheet steel, has the base of the U welded or brazed, or both welded and brazed, to the surfaces of the base plate 1. At each outer side of this U-shaped member 3, is a reinforcing member, consisting of the L-shaped plates 31 and 32. These are also welded or brazed to the outer faces of the U-shaped member 3 and to the outer face of the base plate 1, so that these members and the base plate become in effect one integral body.

Figure 2:
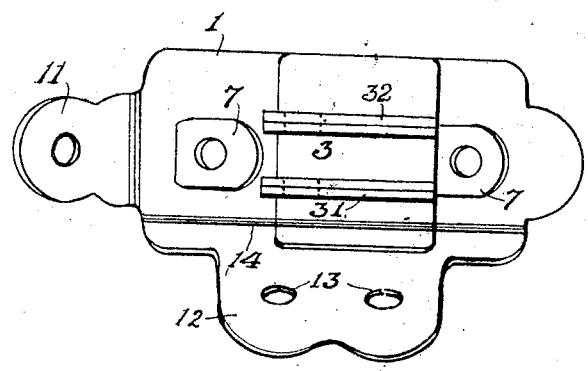
Fig. 2 is a view of the outer face of this fitting.

By this construction, ears are provided which have sufficient body to be strong and also to furnish a reasonable wearing surface for the pivotal pin. The manner of securing these to the base plate is also such that great strength and reliability may be secured. The plate 31 which is at the side of the fitting next to the ears 12, has its end 33 extending up a short distance beyond the point 14 at which the bend is made between the base plate and the ears 12. This bend, in reality, is inward from the true base of the ears 12 as is clearly seen in Fig. 2. This reinforcing strengthens the ears 12 against side bending.

A fitting for this purpose may be made after the design shown and described, very cheaply and at the same time it will be very strong for its weight. It is also possible by this plan to make such fittings rapidly and accurately.

What I claim as my invention is:

A fixture for airplane framing comprising a metal base plate having pivot ears at one side composed of a U-shaped piece having the base thereof fused to the face of the base plate and two L-shaped reinforcing plates having their two arms fused, one to the base plate and the other to the outer faces of the U-shaped piece.

Signed at Seattle, Washington, this 27th day of June 1918.

JOHN W. MILLER.